J. B. PADON.

Re-Winnowing Attachment for Thrashers.

No. 5,438. Reissued June 3, 1873.

WITNESSES

John W. Collins

C. M. Whitney

INVENTOR

Jno. B. Padon by

Samuel S. Boyd

Atty

AM. PHOTO-LITHOGRAPHIC CO. N.Y. (OSBORNE'S PROCESS.)

UNITED STATES PATENT OFFICE.

JOHN B. PADON, OF TROY, ILLINOIS.

IMPROVEMENT IN RE-WINNOWING ATTACHMENTS FOR THRASHERS.

Specification forming part of Letters Patent No. 136,175, dated February 25, 1873; reissue No. 5,438, dated June 3, 1873; application filed May 17, 1873.

*To all whom it may concern:*

Be it known that I, JOHN B. PADON, of Troy, Madison county, State of Illinois, have invented a new and useful Improvement in Re-Winnowing Attachments for Thrashers, of which the following is a full, clear, and exact description, reference being had to the annexed drawing making part of this specification, in which—

Figure 1:
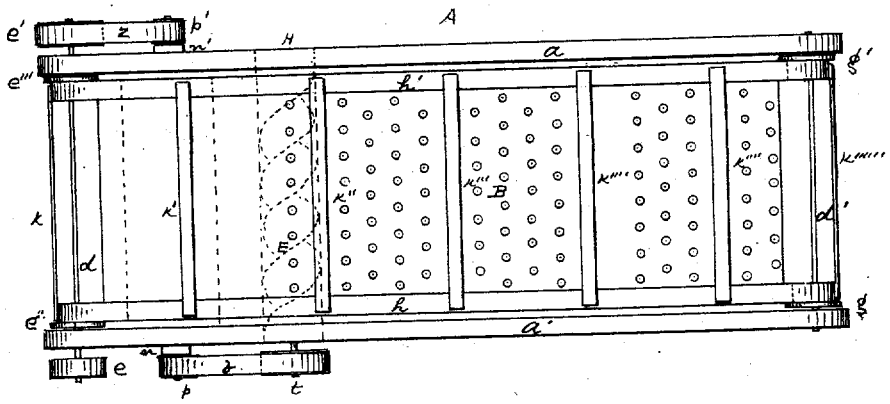
Figure 2:
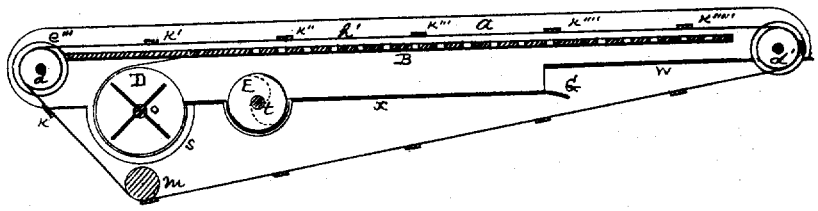

Figure 1 represents a top plan of same. Fig. 2 represents a longitudinal sectional view of same.

Similar letters indicate like parts.

In the ordinary grain separating and thrashing machines, no inconsiderable quantity of grain passes off in the straw and chaff, and is consequently lost, as the amount so carried away will not repay the labor of passing the straw again through the machine. To save this loss and yet not increase the labor is the object I have in view in the attachment to such machines hereinafter to be described.

It consists of a frame, A, formed of two side pieces, *a a'*, Fig. 1, *a*, Fig. 2, connected by a sufficient number of cross-pieces, and having between them a perforated bed, B. In order to save weight, this bed is preferably made of wood, covered with sheet metal on its upper surface, the wood and metal being perforated, as seen, the perforations being made sufficiently large to allow the grain to pass readily through them, and being countersunk on the upper surface, so as to present a somewhat roughened bed to the passing straw, and thereby more surely catching the grain in the passing straw. At either end of the frame is a shaft, *d d'*, the former having upon it four pulleys or rollers, *e e' e'' e'''*, the two former being outside of the side pieces, while the latter are inside. On *d'* are also two rollers, *g g'*, both, however, inside of the side pieces. On the rollers *e'' e'''* and *g g'* are two endless belts, *h h'*, connected by slats *k k' k''*, &c., and passing under the roller *m*, Fig. 2, beneath the frame, and having its bearings in the arms *n n'*, Fig. 1, attached to the side pieces. These arms *n n'* also afford bearings to the shaft *o*, Fig. 2, of the fan D, Fig. 2, the fan being inclosed in a covering, *s*, and the shaft having on either end a pulley, *p p'*, Fig. 1, beneath the bed B, and having its bearings in the side pieces in the shaft *t* of the worm E, Figs. 1, 2, inclosed, as seen in Fig. 2. The side pieces *a a'* are made with an offset, as seen in Fig. 2, so that the plate *w*, which connects the lower edge of the end of the frame, is above the plate *x*, which connects the lower edge of the remainder of the frame, there being a space between the bed B and the plate *w*, and a considerably broader or deeper space between such bed and the plate *x*. This frame is attached in any suitable manner to the thrashing-machine directly beneath the chute or other device for discharging the straw after being thrashed, in such a manner that this straw shall fall upon the bars of the endless belts, the apparatus being set at, say, an angle of forty-five degrees. The pulley *e* is connected by a belt with the power driving the thrasher, which thus drives the belts, and by means of a belt, *z*, connecting the pulley *e'* and the pulley *p'* on the end of the fan-shaft, sets the fan in motion, a belt, *b*, on the other end of the fan-shaft communicating motion to the pulley of the worm-shaft *t*. The straw then falling upon the bars *k k'*, &c., is carried along and thrown from the upper end of the frame into the receptacle placed beneath it to receive it, but in its course over the bed B it drops the grain not already thrashed or separated from it, through the openings in the bed upon the plates *w* and *x*, whence it falls into the well of the worm E, which by its motion expels it at the side of the frame at H, Fig. 1. The fan D, being all the time in rapid motion, blows the chaff and other impurities through the opening G, between the plates *x* and *w*. The continual dropping of the straw on the bars *k k'*, &c., gives them a vibratory movement, which aids in freeing the grain from the straw.

As already stated, this apparatus is attached to the thrasher or separator in any suitable manner, and, if desired, it may be rendered adjustable to any desired angle by a very obvious and simple arrangement of pulleys. In general, however, I find that at an angle of forty-five degrees the apparatus gives the best results.

What I claim as my invention, and desire to secure by Letters Patent, is—

1. The frame A, perforated bed B, plates *x* and *w*, belts *h h'*, bars *k k'*, &c., fan D, and operating-pulleys, all combined and constructed and arranged as and for the purpose shown and specified.

2. The frame A, perforated bed B, plates *x* and *w*, belts *h h'*, bars *k k'*, &c., fan D, worm E, and operating-pulleys, the several parts being combined, constructed, and arranged as and for the purpose shown and specified.

JOHN B. PADON.

Witnesses:

SAML. S. BOYD,

CHAS. D. MOODY.